F. O. JAQUES, Jr.
THREAD CUTTING TOOL.
APPLICATION FILED MAR. 15, 1911.
998,520.
Patented July 18, 1911.
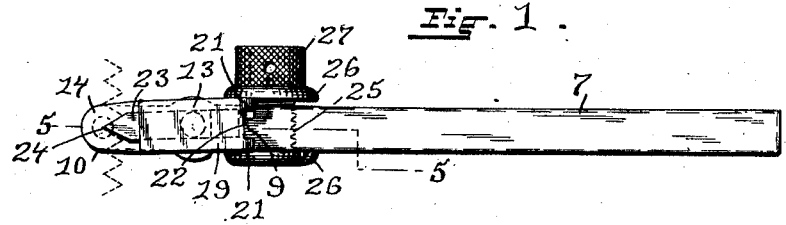
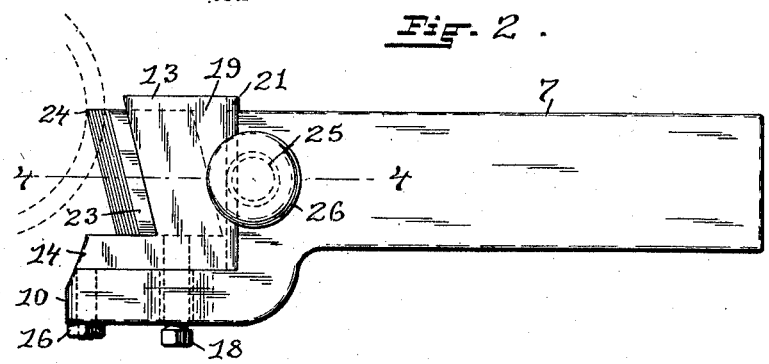
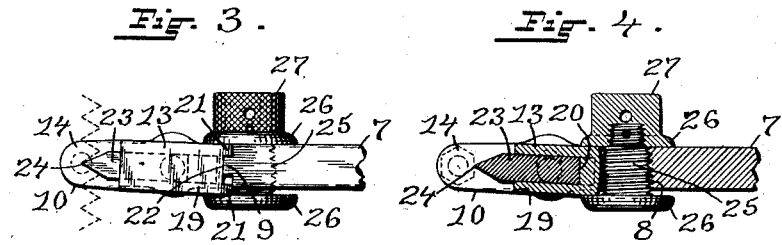
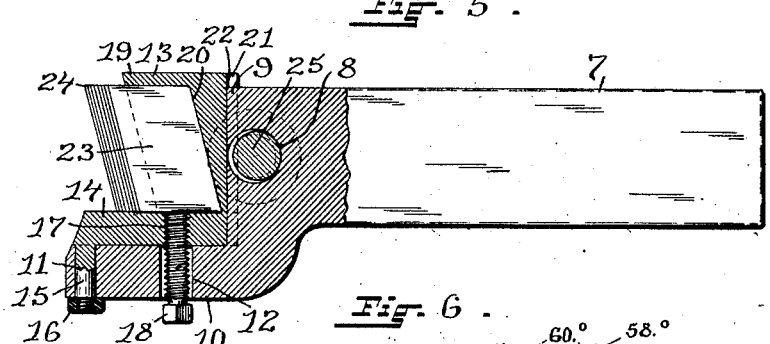
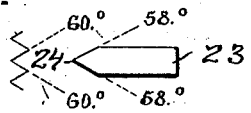
WITNESSES:
INVENTOR:
Fernando Oscar Jaques, Jr.,
by Chas. H. Luther
ATTORNEY.

UNITED STATES PATENT OFFICE.

FERNANDO OSCAR JAQUES, JR., OF CRANSTON, RHODE ISLAND, ASSIGNOR OF ONE-HALF TO ARTHUR POTTER MOWRY, OF PROVIDENCE, RHODE ISLAND.

THREAD-CUTTING TOOL.

998,520.     Specification of Letters Patent.     Patented July 18, 1911.

Application filed March 15, 1911. Serial No. 614,696.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Thread-Cutting Tools, of which the following is a specification.

This invention has reference to an improvement in machine tools and more particularly to an improvement in thread cutting tools for lathes and other thread cutting machines.

In the usual construction of thread cutting tools the angle of the cutting point of the tool is the same as the angle of the thread to be cut. The pressure of the tool on the work is on a direct line through the point of the tool and the V shape point of the tool cuts on both sides of the point, at the same time. The pressure being on a direct line with the point of the tool and at direct right angles to the work, tends to and does at times spring the work out of true, thereby distorting the thread. If the depth of the finished thread is one quarter of an inch, the tool cutting on both sides of the point, cuts a surface cut equal to one half of an inch or more, which requires double the pressure over a tool cutting on one side only of the point, for the same depth of cut. When soft places or imperfections occur in the work the present form of tool cutting on both sides will gouge into these places, thereby cutting an imperfect thread and with the pressure on a direct line with the point of the tool, the extreme point wears out quickly thereby necessitating frequent sharpening of the tool to renew the point. It has been found in practice, with the use of the present form of thread cutting tool that it requires over two days on some work, to cut a screw-thread that is practically accurate, and if it is required to remove, sharpen and replace the tool during the cutting of thread it is then impossible to cut a practically perfect thread.

The object of my invention is to improve the construction of a thread cutting tool whereby a more perfect screw-thread is cut than has heretofore been done.

Another object of my invention in a thread cutting tool, is to eliminate so far as possible, the usual pressure of the tool at right angles to the work and convert the same into a pressure at an oblique angle to the axis of the work or toward the end of the work, where the work is rigidly held in the usual way.

Another object of my invention is to construct a thread cutting tool so that the same will cut alternately the sides of a screw-thread, thereby reducing the pressure at right angles to the work, one half.

Another object of my invention is to construct a thread cutting tool with a V shape cutting point, the angle of which is less than the angle of the thread to be cut, and to provide the tool with means for swinging the tool on a center coinciding with the point of the tool, to compensate for the difference in the angle of the tool and thread to be cut.

Another object of my invention is to simplify the construction of a thread cutting tool embodying the above features, thereby reducing the cost of manufacturing the same.

My invention consists in the peculiar and novel construction of a thread cutting tool for cutting screw-threads in lathes and other screw-cutting machines, said screw-cutting tool having details of construction, as will be more fully set forth hereinafter and claimed.

Figure 1. is a top plan view of my improved thread cutting tool, showing the same adjusted to cut the left side of a V shape screw-thread, which is indicated in dotted lines. Fig. 2. is a side view of the thread cutting tool. Fig. 3. is a top plan view similar to Fig. 1, with the greater portion of the shank broken away and showing the tool adjusted to cut the right side of a screw thread. Fig. 4. is a longitudinal transverse sectional view taken on line 4. 4. of Fig. 2. through the tool. Fig. 5. is a vertical sectional view through the cutting end of the tool, taken on line 5. 5. of Fig. 1. and Fig. 6. is a diagrammatic view illustrating the difference between the angle of the V shape cutting point of the tool and the angle of the thread to be cut.

In the drawings 7. indicates a shank by which the tool is held under working conditions, 8. a transverse screw-threaded hole at the forward end of the shank, 9. a central vertical rib on the forward end of the shank, 10. a lower forward extension forming an L shape end on the forward end of the shank and having a vertical hole 11. at the end and a central vertical hole 12. all formed integral, 13. a point holding member comprising an arm 14. having a pivot pin 15. pivotally secured in the hole 11. by a nut 16. on a line with the point of the tool, a vertical screw-threaded hole 17. in alinement with the hole 12. a screw 18. in the screw-threaded hole 17. and extending downward through the hole 12. and a box shape upward extension 19. closed on the top, bottom and sides, open at the front and having an upwardly and outwardly inclined inner face 20. on the back and two vertical side ribs 21. 21. forming a central groove 22. for the rib 9. which in connection with the ribs 21. 21. form stops, to limit the side swing of the point holding member 13. 23 a thread cutting point shaped to fit in the box shape extension 19. and having a V shape cutting point 24. the angle of which is approximately 58°. for cutting a 60°. screw-thread, and 25. a transverse screw in the screw-threaded hole 8. and having an annular flange 26. on each end, which engage with the sides of the point holding member 13. and a knurled head 27. on one end of the screw for convenience in turning the screw.

The thread cutting point 23. when worn down is always brought up and outward into its correct position to bring the extreme point over the pivot pin 15, by the inclined face 20. on the back of the tool holding member 13. and firmly clamped in position by the screw 18.

When in use the tool is held by the shank 7. in the usual way and the screw 25. turned to swing the point holding member 13. on its pivot either to the right or left. The extreme point of the thread cutting point 23. is always on a straight line drawn through the center of the pivot pin 15. and intersecting the extreme point of the cutting point 23. therefor the extreme point of the cutting point 23. is stationary relative to the tool. When the point holding member 13. is swung to the right, the cutting point 23. cuts on the right side of the point only and on the left side of the thread, as shown in Fig. 1. When this cut is completed the point holding member 13. is swung to the left, the cutting point 23. now cuts on the left side of the point only and on the right side of the thread, as shown in Fig. 3. These operations are repeated, alternately cutting on the sides only of the thread, until the required depth of cut is obtained and the screw thread completed.

As there is no direct pressure on the extreme point and pressure is reduced one half, wear on the point is materially reduced and the thrust of the tool now being toward the ends of the work, instead of at right angles, as heretofore, springing of the work is practically eliminated even when the work is comparatively long and of small diameter.

Having thus described my invention I claim as new and desire to secure by Letters Patent:—

1. A thread cutting tool, comprising a body member, a thread cutting member having a V shape cutting point, the angle of which is less than the angle of the thread to be cut, a swinging member supported by the body member and adapted to hold the thread cutting member in its operative position, said swinging member being unadjustable radially and having a limited swinging movement on an unchangeable center coinciding with the extreme point of the thread cutting member, means for operatively securing the swinging member to the body member, means for rigidly securing the thread cutting member to the swinging member and means for limiting the swinging movement of the swinging member.

2. A thread cutting tool, comprising a body member, a swinging member pivotally secured to the body member, a thread cutting member having a V shape cutting point, the angle of which is less than the angle of the thread to be cut, means for detachably securing the thread cutting member in the swinging member, in a position for the extreme point of the cutting member to coincide with a line drawn through the center of the pivot of the swinging member.

3. A thread cutting tool, comprising a body member, a swinging member pivotally secured at its forward end to the body member, a thread cutting member having a V shape cutting point, the angle of which is less than the angle of the thread to be cut, means for detachably securing the thread cutting member in the swinging member, in a position for the extreme point of the cutting member to coincide with a line drawn through the center of the pivot of the swinging member, means for alternately swinging the swinging member and means for limiting the swinging movement of the swinging member.

4. A thread cutting tool, comprising a body member having a shank and a lower forwardly extending arm, a swinging member pivotally secured to the forward end of the arm, a thread cutting member having a V shape cutting point, the angle of which is less than the angle of the thread to be cut, and detachably secured in the swinging member, in a position for the extreme point of the cutting member to coincide with a line drawn through the center of the pivot of the swinging member, an adjusting member in the body member and operatively connected with the swinging member and means for limiting the side movement of the swinging member.

5. A thread cutting tool, comprising a body member having an elongated shank and a lower forwardly extending arm forming an L shape head, a box shaped swinging member closed on the top, bottom, back and sides, open on the front and having a lower forwardly extending arm pivotally secured to the forward end of the arm on the body member, a thread cutting member having a V shape cutting point, the angle of which is less than the angle of the thread to be cut, and detachably secured in the box shaped swinging member, in a position for the extreme point of the cutting member to coincide with a line drawn through the center of the pivot of the swinging member, means for securing the cutting member in the swinging member, an adjusting member extending transversely through the body member and operatively connected with the swinging member, and means for limiting the side swing of the swinging member.

6. A thread cutting tool, comprising a body member having a shank, a transverse screw-threaded hole, a central vertical rib, a lower forward extension having a vertical hole at its end and a central vertical hole, a point holding member having an arm, a pivot pin in the hole at the end of the forward extension, means for pivotally securing the pin in the hole, a vertical screw-threaded hole, a screw in the vertical screw-threaded hole, a box shape extension closed on the top, bottom, sides and back and open on the front, an upwardly and outwardly inclined inner face on the back, and vertical side ribs on the back forming a central vertical groove in the back, a thread cutting point having a body shaped to fit in the box shape extension and having a V shaped cutting point, the angle of which is less than the angle of the thread to be cut, the extreme point of the thread cutting point intersecting a line drawn vertically through the center of the pivot pin, a transverse screw in the transverse screw-threaded hole and having an annular flange on each end engaging with the sides of the point holding member and means for turning the transverse screw.

In testimony whereof, I have signed my name to this specification in the presence of two subscribing witnesses.

FERNANDO OSCAR JAQUES, Jr.

Witnesses:
ARTHUR P. MOWRY,
CHAS. H. LUTHER.

---

Copies of this patent may be obtained for five cents each, by addressing the "Commissioner of Patents, Washington, D. C."